(12) United States Patent
Wang et al.

(10) Patent No.: US 9,217,362 B2
(45) Date of Patent: Dec. 22, 2015

(54) TWO-STAGE TURBOCHARGER FLOW CONTROL

(71) Applicant: GM GLOBAL TECHNOLOGY OPERATIONS LLC, Detroit, MI (US)

(72) Inventors: Yue-Yun Wang, Troy, MI (US);
Ibrahim Haskara, Macomb, MI (US);
Kevin Andrew Gady, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 14/023,947

(22) Filed: Sep. 11, 2013

(65) Prior Publication Data

US 2015/0068203 A1 Mar. 12, 2015

(51) Int. Cl.

| | |
|---|---|
| *F02D 23/00* | (2006.01) |
| *F02B 37/013* | (2006.01) |
| *F02B 37/16* | (2006.01) |
| *F02B 37/18* | (2006.01) |
| *F02M 37/18* | (2006.01) |
| *F02B 37/00* | (2006.01) |
| *F02D 41/00* | (2006.01) |
| *F02D 41/18* | (2006.01) |

(52) U.S. Cl.
CPC ............ *F02B 37/013* (2013.01); *F02B 37/004* (2013.01); *F02B 37/168* (2013.01); *F02B 37/183* (2013.01); *F02D 41/0007* (2013.01); *F02D 41/18* (2013.01); *F02M 37/18* (2013.01); *F02D 2200/0406* (2013.01)

(58) Field of Classification Search
USPC .............................. 60/39.6–39.63, 597–624; 123/559.1–566, 200–249
See application file for complete search history.

(56) References Cited

U.S. PATENT DOCUMENTS

| | | | |
|---|---|---|---|
| 2006/0123782 A1* | 6/2006 | Rosin et al. ...................... | 60/599 |
| 2007/0062188 A1* | 3/2007 | Fry et al. .......................... | 60/599 |
| 2012/0210710 A1* | 8/2012 | Chevalier et al. ................ | 60/602 |
| 2012/0210711 A1* | 8/2012 | Petrovic et al. .................. | 60/602 |
| 2012/0222417 A1* | 9/2012 | Fontvieille et al. ............. | 60/602 |
| 2013/0209291 A1* | 8/2013 | Kitsukawa et al. ........ | 417/410.1 |
| 2014/0067230 A1* | 3/2014 | Liu et al. ....................... | 701/102 |
| 2014/0230530 A1* | 8/2014 | Fontvieille et al. ......... | 73/114.13 |

\* cited by examiner

*Primary Examiner* — Jesse Bogue
(74) *Attorney, Agent, or Firm* — Quinn Law Group, PLLC

(57) ABSTRACT

A method is disclosed for controlling a two-stage turbocharger system having low-pressure and high-pressure turbochargers in line, sequentially, with an engine. The turbochargers include a low-pressure (LP) turbine and an LP compressor, and a high-pressure (HP) turbine and an HP compressor. The LP compressor feeds the HP compressor, which feeds the engine intake. The engine exhaust feeds the HP turbine, which feeds the LP turbine. The method determines a total boost pressure, which provides combustion reactant for the engine. The method calculates an LP compressor power from the determined total boost pressure, and an LP turbine flow from the LP compressor power. The low-pressure turbocharger operates at the calculated LP turbine flow. The method calculates an HP compressor power from the determined total boost pressure, and an HP turbine flow from the HP compressor power. The high-pressure turbocharger operates at the calculated HP turbine flow.

7 Claims, 8 Drawing Sheets

TWO-STAGE TURBOCHARGER FLOW CONTROL

TECHNICAL FIELD

This disclosure relates to control of turbochargers for powertrains, particularly control of two-stage turbocharger systems.

BACKGROUND

Internal combustion engines may use turbochargers to provide forced induction. One or more turbochargers are driven by exhaust gas from the engine. The energy captured from the exhaust gas is used to pressurize intake gases used in combustion within the engine.

SUMMARY

A method for controlling a two-stage turbocharger system is provided. The two-stage turbocharger system has a low-pressure turbocharger and a high-pressure turbocharger sequentially in line with an engine. The low-pressure turbocharger has a low-pressure turbine (LP turbine) and a low-pressure compressor (LP compressor), and the high-pressure turbocharger has a high-pressure turbine (HP turbine) and a high-pressure compressor (HP compressor). The LP compressor is operatively connected to the HP compressor, which is operatively connected to an intake of the engine. The LP turbine is operatively connected to the HP turbine, which is operatively connected to an exhaust of the engine.

The method includes determining a total boost pressure for the two-stage turbocharger system. The total boost pressure provides sufficient combustion reactant for the engine.

The method calculates an LP compressor power from the determined total boost pressure, and calculates an LP turbine flow from the LP compressor power. The method commands the low-pressure turbocharger to operate at the calculated LP turbine flow.

The method calculates an HP compressor power from the determined total boost pressure, and calculates an HP turbine flow from the HP compressor power. The method commands the high-pressure turbocharger to operate at the calculated HP turbine flow.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
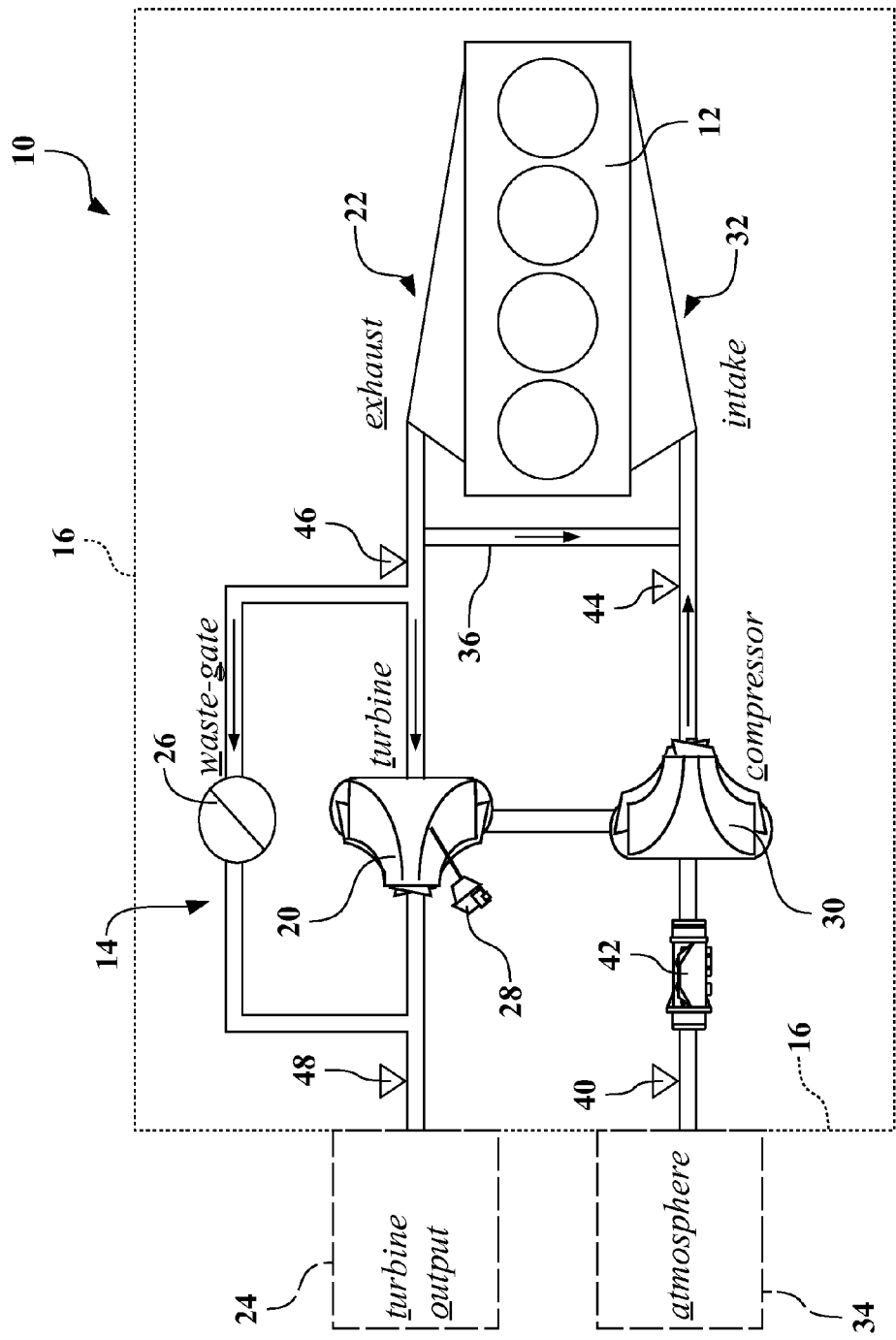
FIG. 1 is a schematic diagram of a portion of a powertrain having a variable turbocharger.

Referring to the drawings, like reference numbers correspond to like or similar components wherever possible throughout the several figures. There is shown in FIG. 1 a portion of a powertrain 10, which may be a conventional or hybrid powertrain. The schematic powertrain 10 includes an internal combustion engine 12 and a turbocharger 14. The engine 12 may be spark ignition or compression ignition.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

As shown in FIG. 1, a control system 16 is in communication with, and capable of operating, the powertrain 10. The control system 16 is illustrated in highly schematic fashion. The control system 16 is mounted on-board the vehicle and in communication with several components of the powertrain 10. The control system 16 performs real-time, on-board detection, diagnostic, and calculation functions for the powertrain 10.

The control system 16 may include one or more components with a storage medium and a suitable amount of programmable memory, which are capable of storing and executing one or more algorithms or methods to effect control of the powertrain 10. Each component of the control system 16 may include distributed controller architecture, and may be part of an electronic control unit (ECU). Additional modules or processors may be present within the control system 16. If the powertrain 10 is a hybrid powertrain, the control system 16 may alternatively be referred to as a Hybrid Control Processor (HCP).

The turbocharger 14 includes a turbine 20 operatively connected to an exhaust side of the engine 12, which may simply be referred to as exhaust 22. The turbine 20 is disposed between the exhaust 22 and a turbine output 24, which may then pass through additional components (for example, mufflers, catalytic converters, and the like) before expelling exhaust products to the atmosphere.

The turbocharger 14 is shown equipped with both a wastegate 26 and a variable geometry turbine, which may be referred to simply as VGT 28. However, many configurations will have only one or the other. The wastegate 26 is configured to selectively allow gas exiting the exhaust 22 to bypass the turbine 20, which thereby alters flow through the turbine 20. The VGT 28 selectively alters an effective aspect ratio of the turbine 20 by varying a VGT position, which thereby alters the response of the turbine 20 to flow from the exhaust 22.

The turbocharger 14 also includes a compressor 30 operatively connected to an intake side of the engine 12, which may simply be referred to as intake 32. The compressor 30 is disposed between the intake 32 and an atmosphere 34. As used herein, atmosphere 34 refers generally to the air entering the turbocharger 14 on the side of the compressor 30. Note that prior to the atmosphere 34, air may have already passed through other components, such as air filters.

Additional components may be disposed between the compressor 30 and the engine 12. For example, and without limitation, an intercooler may reduce the temperature of air leaving the compressor 30 before entering the engine 12. In some configurations, exhaust gas recirculation, referred to herein as EGR 36 and shown in phantom, may selectively move some exhaust gases from the exhaust 22 to the intake 32 to be combined with air delivered by the compressor 30. For some of the methods described herein, calculations regarding the turbocharger 14 may be modeled as if the EGR 36 is a portion of the engine 12 and is unrelated to activity of the turbocharger 14.

The turbine 20 is configured to transfer power to the compressor 30. In many configurations, the compressor 30 will be mechanically connected to the turbine 20 for substantially-common rotation therewith. However, other configurations may exist in which the turbine 20 and compressor 30 are linked by gearing arrangements or are electrically linked via generator-motor combinations.

The turbine 20 converts some of the energy of the exhaust gases leaving the exhaust 22 into mechanical energy that is transferred to the compressor 30. In turn, the compressor 30 uses the mechanical energy to pressurize air from the atmosphere 34 and provide that pressurized air to the intake 32.

Throughout the description, symbols may be used to assist in describing different characteristics or states of the powertrain, whether known, unknown, or determined, and whether fixed or variable. Whenever possible, standard or highly recognizable symbols and nomenclature combinations have been used. This description attempts to maintain consistent nomenclature for all symbols. However, those having ordinary skill in the art will recognize that equivalent symbols or nomenclature may be used interchangeably.

The letter "a" may denote characteristics of the atmosphere 34, such that pressure and temperature at the atmosphere 34 may be denoted $P_a$ and $T_a$, respectively. Similarly, the letters "to" may denote characteristics of the turbine output 24, such that pressure and temperature at the turbine output 24 may be denoted $P_{to}$ and $T_{to}$, respectively.

The letter "i" may denote characteristics of the intake 32 and the letters "ex" may denote characteristics of the exhaust 22, such that pressure at the intake 32 and the exhaust 22 may be denoted $P_i$ and $P_{ex}$, respectively. The letter "t" may denote characteristics of the turbine 20 and the letter "c" may denote characteristics of the compressor 30, such that power at the turbine 20 and the compressor 30 may be denoted $E_t$ and $E_c$, respectively. When included in the turbocharger 14, the wastegate 26 may be denoted with the letters "wg."

The powertrain 10 includes sensors or sensor points, which are shown schematically in FIG. 1 as triangles. These sensors or sensor points may generally represent a component or a point of determination for one or more characteristics of the powertrain 10. More than one state, characteristic, or variable value may be determined by any single sensor or sensor point illustrated in FIG. 1.

An atmospheric sensor point 40 and a mass-flow sensor 42 measure or otherwise determine the characteristics of air entering the compressor 30 of the turbocharger 14. An intake sensor point 44 represents characteristics between the compressor 30 and the intake 32.

The pressure at the intake, $P_i$, may also be referred to as the boost pressure, and is the output of energy transferred from the turbine 20 to the compressor 30. In many configurations, the intake sensor point 44 will include an actual sensor, which determines the actual boost pressure. However, the intake sensor point 44 also represents the location of a desired boost pressure or boost pressure command, which is the pressure configured to provide sufficient combustion reactant for the engine 12.

Based upon operating needs of the powertrain 10, or the engine 12, a specific amount of fuel and a specific amount of air will be requested for combustion within the engine 12, in order to provide torque and power to operate the powertrain 10. These are the primary reactants contributing to internal combustion, which produces power for the powertrain 10. In some systems, the desired boost pressure may be considered as an input or given, but in others the desired boost pressure will be calculated or determined. Sufficient combustion reactant may be based on stoichiometric air-fuel mixtures or on variations thereof.

The desired boost pressure may be determined from the accelerator pedal position or other power and torque requests for the engine 12, as determined by the control system 16. For the best operation, the desired boost pressure is equal to the actual boost pressure. One exemplary formula for determining the desired boost pressure is described below.

An exhaust sensor point 46 measures or otherwise determines the characteristics of combustion reactants exiting the engine 12 through the exhaust 22. The exhaust sensor point 46 may measure the temperature, $T_{ex}$, of the gases entering the turbocharger 14. In many configurations, the pressure and mass flow, $P_{ex}$ and $\dot{m}_{ex}$, of the exhaust 22 will not be known, such that the exhaust sensor point 46 illustrates the location at which those characteristics will be determined. A turbine output sensor point 48 measures or otherwise determines the characteristics of combustion reactants exiting the turbocharger 14.

In order to provide the desired boost pressure, the control system 16 varies the power of the turbine 20. Varying the flow of exhaust gases through the turbine 20, varies power output of the turbine 20, which harvests energy from the exhaust gases and transfers that energy to the compressor 30. However, the power and energy of gases exiting the exhaust 22 may vary depending upon operating conditions of the engine 12, which in turn varies the power captured by the turbine 20 and transferred to the compressor 30 and increases difficulty in accurately providing the desired boost pressure.

One solution for providing the desired boost pressure for the powertrain 10 is to create large, multi-dimensional look-up tables. These look-up tables include, at least, atmospheric conditions, air flow into the turbocharger 14, operating states of the engine 12, and conditions at the exhaust 22. Such look-up tables can be very large and may be accurate only within a small range of atmospheric conditions. Therefore, different look-up tables may be required if the vehicle is moved between high-altitude and seal-level operation or between extreme temperature zones. In some instances, these look-up tables must be derived from calibration and testing on each actual vehicle into which the powertrain 10 is installed, in order to account for manufacturing variability.

Another solution for providing the desired boost pressure is for the powertrain 10 to use closed-loop feedback. In such a system, the actual boost pressure is monitored and compared to the desired boost pressure. If there is a difference between the actual boost pressure and the desired boost pressure, an adjustment is made to the power of the turbine 20. For example, if the actual boost pressure is too low, the power output of the turbine 20 is increased. However, a closed-loop system is likely to have considerable time lag, such that the actual boost pressure follows (in terms of time) the desired boost pressure.

For the powertrain 10, the control system 16 implements a method or algorithm for controlling power of the turbine 20. The method is a feed-forward method, which instructs the turbocharger 14 to operate at settings—through alteration of either the wastegate 26 or the VGT position—that will result in the actual boost pressure being substantially equal to the desired boost pressure. The control system 16 may then also use a closed-loop modification system to make minor corrections to the output of the feed-forward method, if needed.

Figure 2:
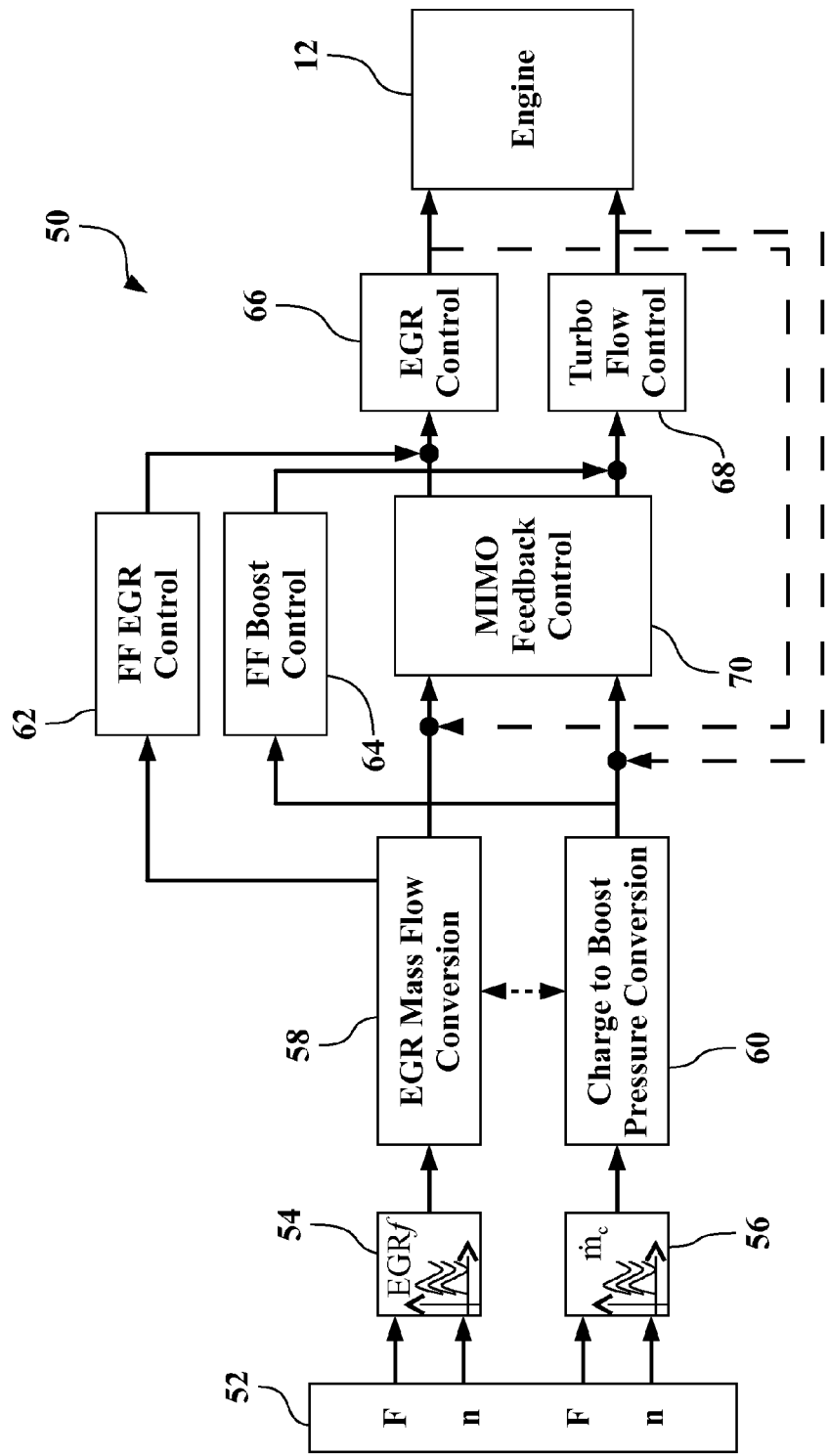
FIG. 2 is a schematic diagram of a controller architecture, which may be used with the powertrain shown in FIG. 1.

Referring now to FIG. 2, and with continued reference to FIG. 1, there is shown a schematic diagram of a controller architecture 50, which may be embodied within the control system 16. The architecture 50 illustrates how the control system 16 may monitor several inputs and may calculate several commands for operating the engine 12.

A set of monitored inputs 52 are fed into a look-up table 54 and a look-up table 56. The monitored inputs 52 include, at least, fuel mass being used by the engine 12 and rotational speed of the engine 12. The look-up table 54 determines an EGR fraction, EGRf, from the monitored inputs 52. The EGR fraction is the amount of recirculated exhaust gases as a fraction of the amount of intake air fed into the intake 32. The look-up table 56 determines a charge flow command, $\dot{m}_{ch}$, from the monitored inputs 52.

The control system 16 uses the EGR fraction to determine an EGR flow command, $\dot{m}_{EGR}$, at an EGR mass flow conversion 58. The EGR flow command may be determined with the formula $\dot{m}_{EGR} = \dot{m}_{ch} * EGRf$.

The control system 16 uses the charge flow command to determine a desired boost pressure at a charge to boost conversion 60. Processes for determining the desired boost pressure are discussed in more detail herein. The charge flow command provides sufficient combustion reactant to the engine 12.

The EGR flow command is used by an EGR feed-forward control 62 and the desired boost pressure is used by a boost feed-forward control 64. The EGR feed-forward control 62 is incorporated into an EGR valve control 66, which determines the position of an EGR valve (not shown) to vary the flow of exhaust gases between the exhaust 22 and the intake 32 of the engine 12.

The boost feed-forward control 64 is incorporated into a turbo flow control 68, which determines operation of the turbocharger 14 to vary the power transferred from the turbine 20 to the compressor 30. The turbo flow control 68 may be linked to and controlling the wastegate 26, the VGT 28, or both.

The architecture 50 is also shown with a feedback controller 70, which may be a MIMO controller, used for closed-loop modification. Based upon actual, measured states at the EGR 36 and the intake sensor point 44, the feedback controller 70 sends modification signals to the EGR valve control 66 and the turbo flow control 68, respectively. Therefore, if there are slight errors in the open-loop commands from the EGR feed-forward control 62 and the boost feed-forward control 64, the feedback controller 70 may implement minor corrections to better achieve the desired EGR flow command and the desired boost pressure.

Figure 3:
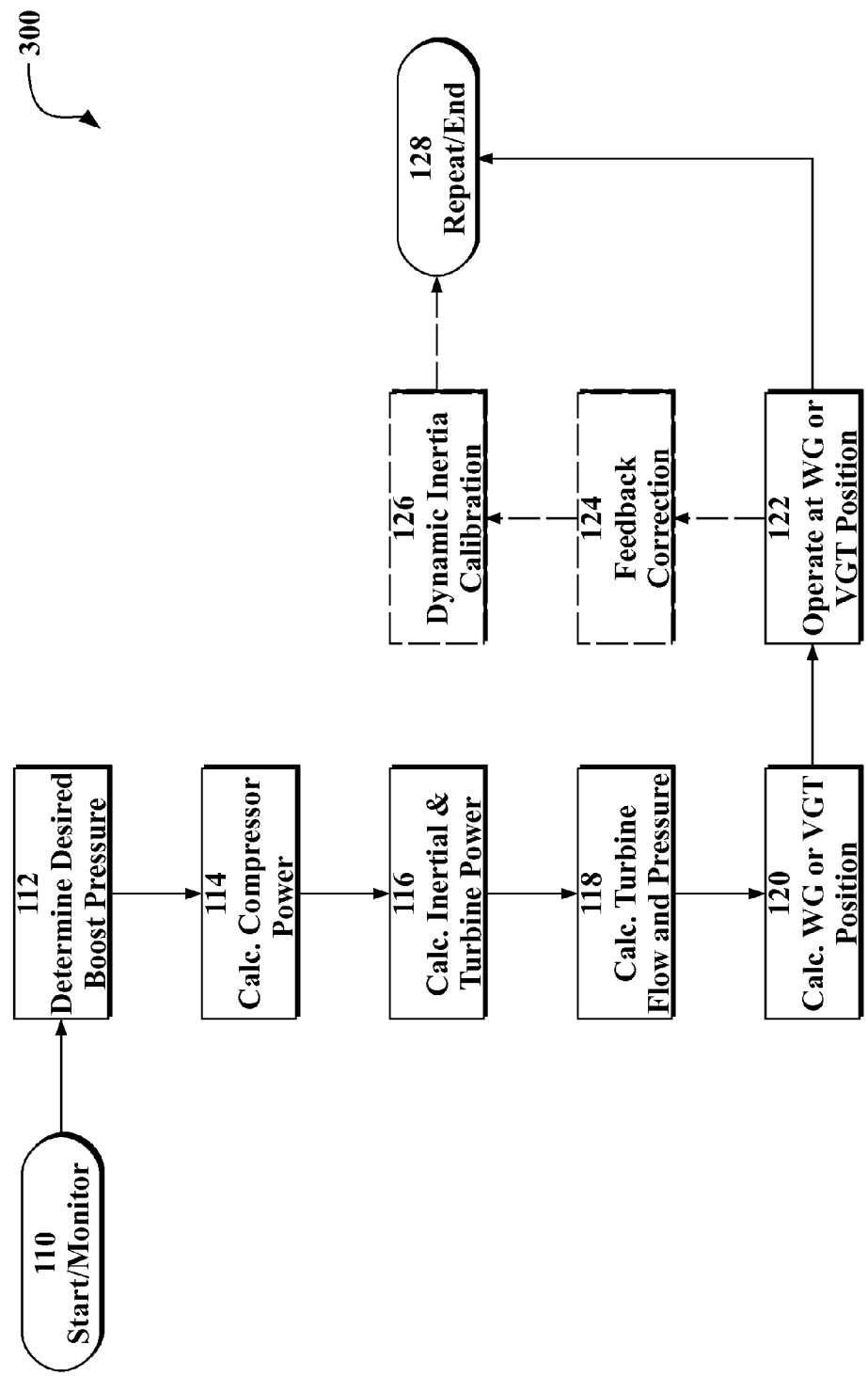
FIG. 3 is a schematic flow chart illustrating an algorithm or method for controlling a turbocharger, such as within the powertrain of FIG. 1.

Referring now to FIG. 3, and with continued reference to FIGS. 1-2, there is shown a method 100 for controlling a powertrain, such as the powertrain 10 shown in FIG. 1. The method 100 may be executed completely or partially within the control system 16.

FIG. 3 shows only a high-level diagram of the method 100. The exact order of the steps of the algorithm or method 100 shown may not be required. Steps may be reordered, steps may be omitted, and additional steps may be included. Furthermore, the method 100 may be a portion or sub-routine of another algorithm or method.

For illustrative purposes, the method 100 is described with reference to elements and components shown and described in relation to FIG. 1 and may be executed by the powertrain 10 itself or by the control system 16. However, other components may be used to practice the method 100 or the invention defined in the appended claims. Any of the steps may be executed by multiple controls or components of the control system 16.

Step 110: Start/Begin Monitoring.

The method 100 may begin at a start or initialization step, during which time the method 100 is made active and is monitoring operating conditions of the vehicle, the powertrain 10 and, particularly, the engine 12 and the turbocharger 14. Initiation may occur, for example, in response to the vehicle operator inserting the ignition key or in response to specific conditions being met. The method 100 may be running constantly or looping constantly whenever the vehicle is in use.

Any of the data output from the sensor points may be monitored by the method 100. Furthermore, simple calculations within control system 16 or data provided by other modules or controllers are not described in detail and may be considered as monitored by the method 100.

Step 112: Determine Desired Boost Pressure.

The method 100 includes determining a boost pressure command or a desired boost pressure, $P_i$, for the compressor 30. The desired boost pressure may be provided by another controller and is configured to provide sufficient combustion reactant for the engine 12. Considerations for the desired boost pressure include pedal position or other power and torque requests for the engine 12.

Alternatively, the desired boost pressure may be calculated by the control system 16 as part of the method 100. The desired boost pressure may be determined according to a boost command equation, shown as equation 1.

$$P_i = \frac{2R \cdot T_i \cdot \dot{m}_{ch}}{n \cdot D \cdot \eta(EGRf, n)} \quad (1)$$

In the boost command equation, R is the ideal gas constant; $T_i$ is the intake temperature; $\dot{m}_{ch}$ is the charge flow command; n is the rotational speed (often in RPM) of the engine 12; D is the engine displacement; and η is the engine volumetric efficiency equation, which is a function of EGR fraction, EGRf, and speed. In configurations without the EGR 36, the charge flow command is equal to the atmospheric mass flow, $\dot{m}_a$, but with the EGR 36, the charge flow command is equal to the sum of the atmospheric mass flow and the EGR mass flow, $\dot{m}_{EGR}$.

Step 114: Calculate Compressor Power.

From the desired boost pressure, the method 100 may calculate a compressor power for the compressor 30. Generally, the compressor power is the amount of power needed to increase the atmospheric pressure, $P_a$, to the desired boost pressure, $P_i$.

The desired compressor power may be determined from either a polynomial equation or lookup table. The compressor power is related to the energy flow based upon the enthalpy of the compressor 30 multiplied by a compressor power function. The desired compressor power may be determined from Equation 2.

$$E_c = v \cdot h_c \cdot r_c (PR_c, Q_c) \qquad (2)$$

In determining the desired compressor power from equation 2: $h_c$ is the energy flow based on the compressor enthalpy and v is a correction factor based upon the enthalpy of the turbine 20, which delivers power to the compressor 30; and $r_c$ is the compressor power function, determined from the compressor pressure ratio, $PR_c$, and the corrected compressor flow, $Q_c$.

The compressor pressure ratio, $PR_c$, is equal to $P_i/P_a$, and represents the pressure gain provided by the compressor 30. The atmospheric pressure, $P_a$, is known from the atmospheric sensor point 40 and the desired boost pressure, $P_i$, is either provided as a given to the method 100 or is determined from the boost command equation herein.

The corrected compressor flow, $Q_c$, and the corrected turbine flow, $Q_t$, may be used by the method 100 as an alternative to the actual compressor flow, $\dot{m}_a$, and the actual turbine flow, $\dot{m}_t$. The corrected compressor flow is calculated from an Equation 3.

$$Q_c = \dot{m}_a \cdot v(P_a, T_a) \qquad (3)$$

In equation 3, v is the correction factor function. By using the corrected flow instead of actual flow, the method 100 accounts for variation in altitude and temperature, which prevents the method 100 from needing substantial recalibration if the vehicle changes elevation or temperature zones.

The correction factor function v may be any number of functions based upon pressure, temperature, or other inputs that will allow the corrected compressor flow to account for variations in altitude or temperature. For example, and without limitation, the correction factor function v may have an inverse relationship to air density, such that the corrected compressor flow becomes an Equation 4.

$$Q_c = \dot{m}_a \cdot v(P_a, T_a) = \dot{m}_a \cdot (T_a / P_a) \qquad (4)$$

The desired compressor power may also be expanded into a polynomial function, as shown in Equation 5.

$$E_c = v(P_{to}, T_{ex}) \cdot h_c \cdot (a_1 + a_2 Q_c + a_3 Q_c^2 + a_4 PR_c + a_5 PR_c^2 + a_6 Q_c PR_c) \qquad (5)$$

Equation 5 is substantially equivalent to the basic desired compressor power function (Equation 2) above. In the polynomial compressor power function: $T_{ex}$ is the temperature of exhaust 22 and $P_{to}$ is the pressure at the turbine output, both of which are used to determine a correction factor function v as a result of conditions at the turbine 20; and $a_1$ through $a_6$ are constants. The constants $a_1$ through $a_6$ are based upon the specific characteristics of the turbocharger 14 and may be determined by, for example, dynamometer testing or modeling with computational fluid dynamics.

The enthalpy or energy flow of the turbine 20 and the compressor 30 may be determined by the method 100 based upon the flow rate and temperature of the gases passing through the turbine 20 and the compressor 30. The enthalpy of the turbine 20, $h_t$, and the compressor 30, $h_c$, may be expressed in Equation 6 and Equation 7.

$$h_t = \dot{m}_t c_p T_{ex} \qquad (6)$$

$$h_c = \dot{m}_a c_p T_a \qquad (7)$$

In Equations 6 and 7, $c_p$ is specific heat and $T_a$ and $T_{ex}$ are the atmospheric and exhaust temperatures, respectively. If the turbocharger 14 is equipped with the VGT 28 and does not include the wastegate 26, the turbine flow and the exhaust flow are equal, such that $\dot{m}_t = \dot{m}_{ex}$, because all exhaust flow is passing through the turbine 20.

Note that, as shown herein, the turbine enthalpy may not be directly calculated. Instead, the method 100 determines the turbine pressure ratio and corrected turbine flow from compressor power and inertial power, without determining the turbine enthalpy.

Note that the above compressor power function or polynomial compressor power function may be converted into one or more look-up tables, although the respective look-up tables may be large. Generally, as used herein, any function may be placed into a look-up table or a group of look-up tables, instead of calculated directly from the equation by the control system 16. Depending upon the number of inputs to the equation, look-up tables may either increase or decrease computational throughput for the method 100.

Step 116: Calculate Inertial Power and Turbine Power.

The method 100 may calculate the turbine power or desired turbine power, $E_t$. This calculation may occur directly through Equation 8.

$$E_t = h_t \cdot r_t (PR_t, VGT) = h_t \cdot r_t (Q_t, VGT) \qquad (8)$$

The desired turbine power is the power needed from the turbine 20 in order to supply the calculated compressor power to the compressor 30. Therefore, the method 100 may also use the compressor power to indirectly calculate the desired turbine power. In most operating conditions, the turbocharger 14 is already spinning, and will have some energy and power as a result of its inertia. Therefore, the desired power, $E_t$, from the turbine 20 is shown in Equation 9.

$$\eta_m E_t = E_c + E_j \qquad (9)$$

In the above, $E_j$ is the inertial power of the spinning turbocharger 14; and $\eta_m$ is the mechanical efficiency between the turbine 20 and the compressor 30, which may be close enough to one—particularly where the turbine 20 and compressor 30 are mechanically linked in close proximity—such that $\eta_m$ can be ignored in the turbine power equation.

Therefore, the method 100 calculates the desired power for the turbine 20 based upon power balance with the compressor power and the inertial power. The inertial power is shown in Equation 10.

$$E_j = J \cdot \omega \cdot \dot{\omega} \qquad (10)$$

In Equation 10, the method 100 determines the inertial power from the rotation, $\omega$, and acceleration, $d\omega/dt$, of the turbocharger 14 and the area moment of inertia, $J$, of the turbocharger 14.

As shown in the inertial power function, the method 100 may also calculate the rotational speed of the turbocharger 14. The rotational speed is calculated by an Equation 10.

$$\omega = d_1 + d_2 Q_c + d_3 Q_c^2 + d_4 PR_c + d_5 PR_c^2 + d_6 Q_c PR_c \qquad (11)$$

where $d_1$ through $d_6$ are constants. The constants are based upon specific characteristics of the turbocharger 14 used in the powertrain 10 and may be determined by, for example, dynamometer testing or modeling with computational fluid dynamics. From the rotational speed, the method 100 may also calculate the rotational acceleration, $d\omega/dt$, of the turbocharger 14. Acceleration may be determined, for example and without limitation, by taking the derivative of the rotational speed equation.

Alternatively, acceleration may be determined through iterative sampling and analysis of changes to the rotational speed. Consecutive iterations of the method 100 may be labeled as occurring at time$_k$, the instantaneous or present iteration, and time$_{k-1}$, the previous iteration. Therefore, the method 100 may compare the rotational speed, ω, from time$_k$ and time$_{k-1}$, and determine the change between the two iterations. If there is no change in the rotational speed, the acceleration is zero.

With the inertial power and the compressor power, the method 100 may essentially skip calculating the turbine power, and the method 100 may instead utilize computational resources for calculating the turbine flow, $Q_t$, and the turbine pressure ratio, $PR_t$.

Step 118: Calculate Turbine Flow and Pressure.

The method 100 may calculate the corrected turbine flow as a function of the compressor power and the inertial power. Then, the method 100 may calculate turbine pressure ratio as a function of the corrected turbine flow. The corrected turbine flow and the turbine pressure ratio may be calculated by Equation 12 and Equation 13.

$$Q_t = f(E_c + E_j) = b_1 + b_2 E_c + b_3 E_c^2 + b_4 E_j \quad (12)$$

$$PR_t = f(Q_t) = c_1 + c_2 E_c + c_3 E_c^2 + c_4 E_j \quad (13)$$

where $b_1$ through $b_4$ and $c_1$ through $c_4$ are constants. The constants are based upon specific characteristics of the turbocharger 14 used in the powertrain 10 and may be determined by, for example, dynamometer testing or modeling with computational fluid dynamics. As an alternative to the polynomial forms of the equations or functions for $Q_t$ and $PR_t$, the method 100 may use look-up tables to find the $Q_t$ and $PR_t$ from $E_c$ and $E_j$.

These are the calculated flow characteristics needed for the turbine 20—as one side of the turbocharger 14—to deliver sufficient power to the compressor 30—as the other side of the turbocharger 14—in order to provide the sufficient power to achieve the desired boost pressure, $P_i$. From these flow characteristics, the method 100 may then determine how the turbocharger 14 should modify flow of exhaust gases through the turbine 20.

Step 120: Calculate Wastegate Position or VGT Position.

Modifying the flow of exhaust gases from the exhaust 22 to the turbine output 24 alters the effective flow through the turbine 20. Furthermore, modifying flow through the turbine 20 changes the amount of power drawn from the exhaust 22 and transferred to the intake 32 as the desired boost pressure. Generally the modification occurs through either the wastegate position of the wastegate 26 or the VGT position of the VGT 28.

Changing the VGT position alters flow patterns through the turbine 20, itself. For example, variable blades or fins within the turbine 20 selectively change the pressure delivered to the blades of the turbine 20, such that less of the available energy from the gases is transferred to the turbine 20. The wastegate 26 achieves a similar result by allowing exhaust gases to avoid passing through the turbine 20 at all. As the wastegate position increases, less of the available exhaust product is routed through the turbine 20 before reaching the turbine output 24, such that less of the available energy from the gases is transferred to the turbine 20.

For the wastegate 26 configuration, the mass flow from the exhaust 22 is divided between the turbine 20 and the wastegate 26. Therefore, the method 100 may determine the exhaust flow and the wastegate flow by using Equation 14 and Equation 15, respectively.

$$\dot{m}_{ex} = \dot{m}_{ch} + \dot{m}_{fuel} - \dot{m}_{egr} \quad (14)$$

$$\dot{m}_{wg} = \dot{m}_{ex} - \dot{m}_t$$

where $\dot{m}_{fuel}$ is the mass of fuel added to the charge flow in the engine 12 for combustion; and $\dot{m}_{EGR}$ is the flow of exhaust products redirected from the exhaust 22 back into the intake 32 through the EGR 36. Note that the method 100 may either ignore the effects of the EGR 36 or may assume that the EGR 36 is completely contained within the engine 12, such that the exhaust flow rate includes the effects of the EGR 36.

The wastegate position is controlled to alter the area of the wastegate 26. By increasing the wastegate area, $A_{wg}$, more gases from the exhaust 22 flow through the wastegate 26 instead of the turbine 20. The method 100 may determine the desired wastegate area from one of the following three calculations. The first calculation uses Equation 16, in which area is a function of wastegate flow (the difference between exhaust flow and turbine flow) and pressure ratio across the turbine 20.

$$A_{wg} = f(Q_{ex} - Q_t, PR_t) \quad (16)$$

Mass flow calculations are based upon the orifice function, Ψ, which is a standard orifice function derived from the Bernoulli equation. The mass flow calculations for flow through the turbine 20, $\dot{m}_t$, and total exhaust flow, $\dot{m}_{ex}$, are given by Equations 17 and 18, respectively.

$$\dot{m}_t = A_t \frac{P_{ex}}{\sqrt{R \cdot T_{ex}}} \Psi(PR_t) \quad (17)$$

$$\dot{m}_{ex} = (A_t + A_{WG}) \frac{P_{ex}}{\sqrt{R \cdot T_{ex}}} \Psi(PR_t) \quad (18)$$

In the mass flow calculations, the method 100 determines $\dot{m}_t$ by viewing the turbine 20 as an orifice, and $\dot{m}_{ex}$ by viewing the turbine and the wastegate as a combined orifice; Ψ is the standard orifice function. From the mass flow calculations in Equation 17 and Equation 18, a second calculation for wastegate area is given as Equation 19.

$$A_{wg} = f\left(\frac{Q_t}{Q_{ex}}, PR_t\right) \quad (19)$$

In Equation 19, wastegate area is a function of flow ratio through the turbine 20 and the pressure ratio across the turbine 20. However, in many embodiments, the method 100 may ignore the effects of the turbine pressure ratio, $PR_t$, and simply determine wastegate area, $A_{wg}$, as a function of the flow ratio, $Q_t/Q_{ex}$.

A third calculation of the area of the wastegate 26 is given in Equation 20.

$$A_{wg} = f\left(\frac{E_c + E_j}{P_{to}\sqrt{T_{ex}}}, \frac{\dot{m}_{ex}\sqrt{T_{ex}}}{P_{to}}\right) \quad (20)$$

In Equation 20, each of the components is known, measured, or calculated in other portions of the method 100. The exact functions described herein, where not given explicitly, may be determined through, for example: a look-up table, a neural network model, or a polynomial. Equation 20 has a polynomial equivalent, similar to the illustrative polynomials of Equations 11, 12, and 13, which may be derived based upon testing or modeling of the exact turbocharger 14.

Once the wastegate area $A_{wg}$ is determined, a position command for the wastegate 26 may be determined, depending upon the exact shape, configuration, and actuation mechanism for opening and closing the wastegate 26. Any given wastegate 26 may be commanded by the control system 16 to open to a defined area based upon an electric, mechanical, or electro-mechanical signal command.

Similarly, the method 100 may determine the VGT position as a function of the corrected turbine flow, $Q_t$, and the desired turbine power, $E_t$. Note that the mass flow through the turbine 20, $\dot{m}_t$, is equal to total exhaust flow, $\dot{m}_{ex}$, in the VGT function because there is no alternative route (such as through a wastegate 26), such that $\dot{m}_t = \dot{m}_a + \dot{m}_{fuel}$. Therefore, the VGT position is determined from the same equation as the wastegate area, but the function is simplified because it needs to account for $\dot{m}_{ex}$, only instead of $\dot{m}_t$ and $\dot{m}_{ex}$. The VGT position may be determined with Equation 21.

$$VGTposition = f\left(\frac{E_c + E_j}{P_{to}\sqrt{T_{ex}}}, \frac{\dot{m}_{ex}\sqrt{T_{ex}}}{P_{to}}\right) \quad (21)$$

Note that exhaust flow, $\dot{m}_{ex}$, may be calculated with a time delay, $\tau$, for the airflow mass, $\dot{m}_a$. The time delay accounts for the time needed to move gases from atmospheric sensor point 40 to exhaust sensor point 46. Therefore, exhaust flow may be calculated at time t from airflow mass at time t-$\tau$. Furthermore, the exhaust pressure, $P_{ex}$, may be substituted for the turbine output pressure, $P_{to}$, in Equations 20 and 21. Substituting exhaust pressure for turbine output pressure would alter the coefficients of the function, but would change application thereof.

Varying the VGT position changes the energy captured by the turbine 20 and therefore changes pressure drop across the turbine 20. The method 100 may determine the function for the VGT position through testing or computational fluid dynamics and implement the function through, for example: a look-up table, a neural network model, or a polynomial.

Step 122: Operate at Wastegate Position or VGT Position.

After determining either the wastegate position or the VGT position, the method 100 commands operation of the turbocharger at the determined position. An actuator may be signaled to alter the wastegate area, $A_{wg}$, based upon the calculated wastegate position. Similarly, the VGT 28 may include an actuator to change the position of blades within the turbine 20 based upon the calculated VGT position.

Either the wastegate position or the VGT position are used to control the turbocharger 14 based upon feed-forward control scheme. With these controls, the method 100 moves from desired boost pressure to flow control for the turbine 20 to achieve that desired boost pressure substantially immediately, as an open-loop control for the turbine 20.

Step 124: Optional, Minor Feedback Correction.

The method 100 may include dynamic feedback correction, as shown diagrammatically in FIG. 2. Because the feed-forward flow conditions determined by the method 100 are modeled estimates, it is possible that the measured or actual boost pressure, $P_{i\_measured}$, may vary slightly from the desired boost pressure.

Therefore, the method 100 optionally includes a feedback correction step, which uses close-loop techniques to adjust the wastegate position or the VGT position based upon the actual boost pressure at the intake sensor point 44. If the method 100 determines that the actual boost pressure is below the desired boost pressure, the method 100 increases flow to the turbine 20, which may include decreasing the area of the wastegate 26 to increase flow to the turbine 20. Similarly, if the method 100 determines that the actual boost pressure is above the desired boost pressure, the method 100 decreases flow to the turbine 20, which reduces the power transferred to the compressor 30. These feedback signals may be considered as either adjustments or combinations to the feed-forward commands.

Step 126: Optional, Dynamic Calibration of Inertia.

The method 100 may include calibration of the inertia, J, of the turbocharger 14, which is factored into the inertial power equation and the rotation speed equations. The dynamic calibration may be implemented by an Equation 22, in which the inertia of the turbocharger 14 on subsequent loops is adjusted based upon differences between the desired boost pressure, $P_i$, and the actual boost pressure, $P_{i\_measured}$.

$$J_{k+1} = J_k + \beta \cdot \omega \cdot \dot{\omega}(P_i - P_{i\_measured}) \quad (22)$$

In Equation 22, $J_{k+1}$ is the inertia of the turbocharger 14 on subsequent loops or iterations of the method 100, $J_k$ is the inertia used on the current loop, and Beta is a correction factor. Therefore, the method 100 is able to correct for errors used in calculating the inertia of the turbocharger 14 and quickly iterates to convergence of $J_k$ and $J_{k+1}$.

Step 128: End/Repeat.

After commanding operation of the LP wastegate 226 and the HP wastegate 227 and making or recording any corrections or adjustments for subsequent loops, the method 100 either ends or repeats. The method 100 may proceed to determine the total boost command for the next iteration to control flow through the turbine 20.

Figure 4:
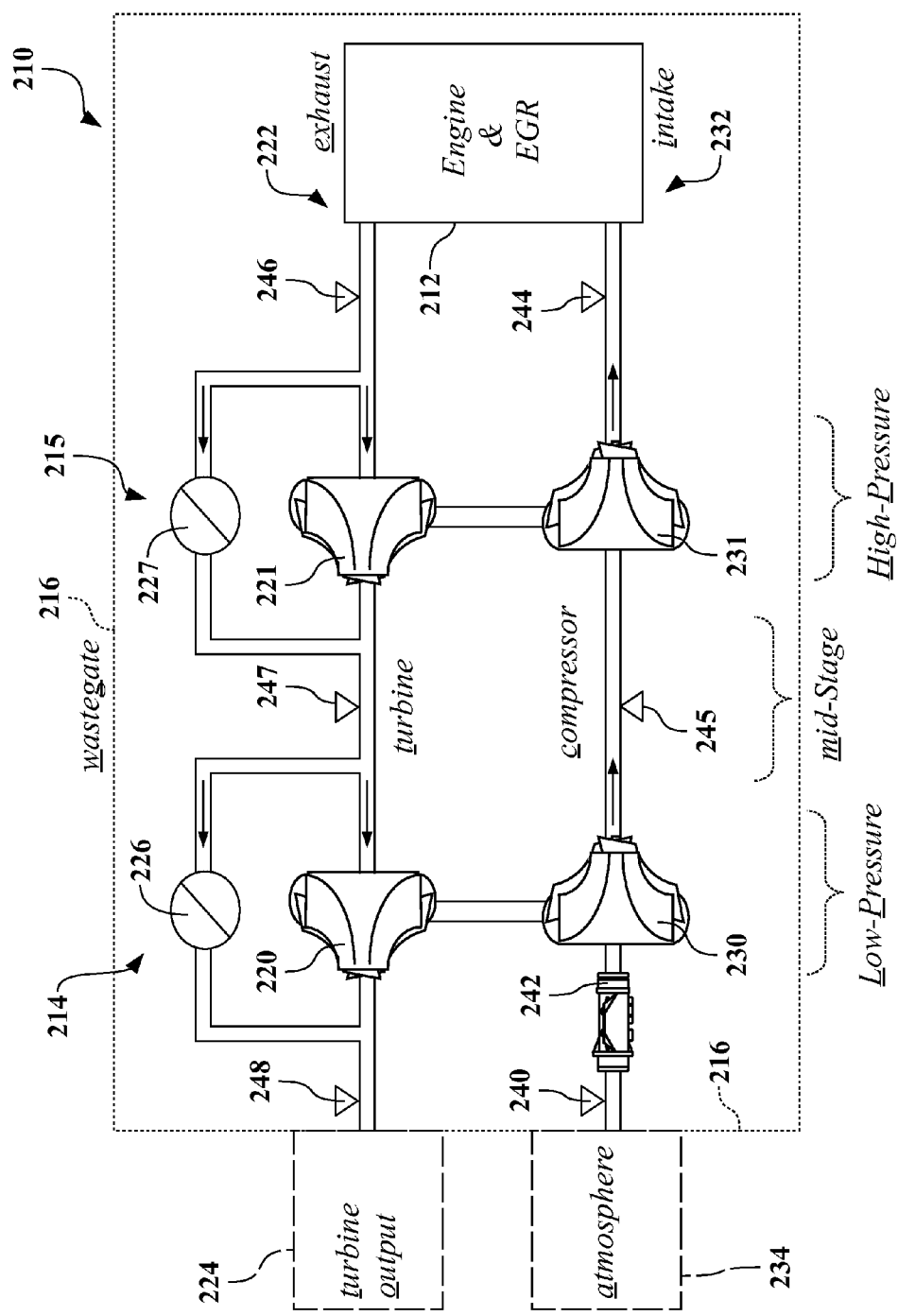
FIG. 4 is a schematic diagram of a portion of a powertrain having two variable turbochargers.

Referring now to FIG. 4, and with continued reference to FIGS. 1-3, there is shown in FIG. 4 a portion of a powertrain 210, which may be a conventional or hybrid powertrain. The schematic powertrain 210 includes an internal combustion engine 212, which may be spark ignition or compression ignition. The powertrain 210 includes a two-stage turbocharger system having a low-pressure turbocharger 214 and a high-pressure turbocharger 215 sequentially in line with the engine 212. Many of the individual components of the powertrain 210 will be apparent from the description of the powertrain 10, and many of the components operate in a similar manner. Furthermore, control strategies relating to FIGS. 1-3 are also applicable to the powertrain 210 and description thereof.

Features shown in one figure or group of figures may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

As shown in FIG. 4, a control system 216 is in communication with, and capable of operating, the powertrain 210. The control system 216 is illustrated in highly schematic fashion. The control system 216 is mounted on-board the vehicle and in communication with several components of the powertrain 210. The control system 216 performs real-time, on-board detection, diagnostic, and calculation functions for the powertrain 210.

The control system 216 may include one or more components with a storage medium and a suitable amount of programmable memory, which are capable of storing and executing one or more algorithms or methods to effect control of the powertrain 210. Each component of the control system 216 may include distributed controller architecture, and may be part of an electronic control unit (ECU). Additional modules or processors may be present within the control system 216. If the powertrain 210 is a hybrid powertrain, the control system 216 may alternatively be referred to as a Hybrid Control Processor (HCP).

The low-pressure turbocharger 214 includes an LP turbine 220 and the high-pressure turbocharger 215 includes an HP turbine 221. The HP turbine 221 is operatively connected to an exhaust side of the engine 212, which may simply be referred to as exhaust 222. The LP turbine 220 is disposed between the HP turbine 221 and a turbine output 224, which may then pass through additional components (for example, mufflers, catalytic converters, and the like) before expelling exhaust products to the atmosphere.

The low-pressure turbocharger 214 is shown equipped with an LP wastegate 226 and the high-pressure turbocharger 215 is equipped with an HP wastegate 227. The LP wastegate 226 is configured to selectively allow gas to bypass the LP turbine 220, which thereby reduces flow through the LP turbine 220. The HP wastegate 227 is configured to selectively allow gas exiting the exhaust 222 to bypass the HP turbine 221, which thereby reduces flow through the HP turbine 221.

Alternatively the low-pressure turbocharger 214 and the high-pressure turbocharger 215 may include variable geometry turbines (VGT), instead of the LP wastegate 226 and the HP wastegate 227. The methods described herein may be applied to either VGT or wastegate systems to vary flow through the LP turbine 220 and the HP turbine 221 and power captured by the LP turbine 220 and the HP turbine 221.

The low-pressure turbocharger 214 has an LP compressor 230 and the high-pressure turbocharger 215 has an HP compressor 231. The HP compressor 231 feeds intake air to an intake side of the engine 212, which may simply be referred to as intake 232. The LP compressor 230 is disposed between atmosphere 234 and the HP compressor 231. As used herein, atmosphere 234 refers generally to the air entering the low-pressure turbocharger 214 on the side of the LP compressor 230. Note that air may have already passed through other components, such as air filters.

The engine 212 is shown schematically in FIG. 4 and includes any exhaust gas recirculation (EGR) systems. Additional components may be disposed between the HP compressor 231 and the engine 212. Therefore, the engine 212 may be viewed as a closed system that provides requests or commands to the powertrain 210.

The LP turbine 220 is configured to transfer power to the LP compressor 230, such as through a shaft or other mechanism. Similarly, the HP turbine 221 is configured to transfer power to the HP compressor 231, such as through a shaft or other mechanism.

The HP turbine 221 converts some of the energy of the exhaust gases leaving the exhaust 222 into mechanical energy that is transferred to the HP compressor 231. In turn, the HP compressor 231 uses the mechanical energy to provide pressurized air to the intake 232. Similarly, the LP turbine 220 converts some of the energy of the exhaust gases leaving the HP turbine 221 into mechanical energy, which is transferred from the LP turbine 220 to the LP compressor 230. In turn, the LP compressor 230 uses the mechanical energy to provide pressurized air to the HP compressor 231, and eventually to the intake 232.

Throughout the description, symbols may be used to assist in describing different characteristics or states of the powertrain, whether known, unknown, or determined, and whether fixed or variable. Whenever possible, standard or highly recognizable symbols and nomenclature combinations have been used. This description attempts to maintain consistent nomenclature for all symbols. However, those having ordinary skill in the art will recognize that equivalent symbols or nomenclature may be used interchangeably. Terminology and designations used with reference to FIGS. 1-3 are continued, whenever possible, for reference in FIG. 4 and subsequent figures.

Characteristics, components, or data related to the low-pressure turbocharger 214 may be designated with "LP," and characteristics, components, or data related to the high-pressure turbocharger 215 may be designated with "HP." For example, power at the LP turbine 220 and the LP compressor 230 may be denoted $E_{LPt}$ and $E_{LPc}$, respectively. Similarly, mid-stage states, those occurring between the low-pressure turbocharger 214 and the high-pressure turbocharger 215 may be designated with "m," such that the mid-stage pressure may be denoted $P_m$.

The powertrain 210 includes sensors or sensor points, which are shown schematically in FIG. 4 as triangles. These sensors or sensor points may generally represent a component or a point of determination for one or more characteristics of the powertrain 210. More than one state, characteristic, or variable value may be determined by any single sensor or sensor point illustrated in FIG. 4.

An atmospheric sensor point 240 and a mass-flow sensor 242 measure or otherwise determine the characteristics of air entering the LP compressor 230 of the low-pressure turbocharger 214. An intake sensor point 244 represents characteristics between the HP compressor 231 and the intake 232. A mid-stage sensor point 245 is located on the compressor side between the LP compressor 230 and the HP compressor 231.

The requested pressure at the intake 232, $P_i$, may also be referred to as the total boost command, and is the pressure resulting from the output of energy transferred from the HP turbine 221 to the HP compressor 231. Alternatively, the pressure at the intake 232 could be referred to as $P_{HP}$, as that is the pressure resulting from the HP compressor 231. However, to maintain consistency with the formulas used in relation to the powertrain 10, this description treats the intake pressure as $P_i$, regardless of the number and arrangement of turbochargers feeding the intake 232.

In many configurations, the intake sensor point 244 will include an actual sensor, which determines or measures the actual boost pressure at the intake 232. However, the intake sensor point 244 also represents the location of the desired boost pressure or total boost command, which is the pressure configured to provide sufficient combustion reactant for the engine 212.

Based on operating needs of the powertrain 210, or the engine 212, a specific amount of fuel and a specific amount of air will be requested for combustion within the engine 212. These are the primary reactants contributing to internal combustion, which produces power for the powertrain 210. In some systems, the total boost command may be considered as an input or given, but in others the total boost command will be calculated or determined.

The total boost command may be determined from the accelerator pedal position or other power and torque requests for the engine 212, as determined by the control system 216. For the best operation, the total boost command is equal to the actual boost pressure. One exemplary formula for determining the total boost command is Equation 1 above, which is also usable with the two-stage turbocharger system of powertrain 210. Alternatively, where effects of EGR are ignored, a modified form of Equation 1 may be used.

From the boost pressure command, $P_i$, and the atmospheric pressure, $P_a$, the control system 216 may determine a total pressure ratio, $PR_i$. The total pressure ratio is the total increase needed between the atmospheric pressure and the pressure at the intake 232. The total boost pressure ratio will be provided by the LP compressor 230 and the HP compressor 231 with energy captured by the LP turbine 220 and the HP turbine 221. Unless otherwise stated, pressures and pressure ratios discussed regarding the powertrain 210 are referring to the intake side, as opposed to the exhaust side.

An exhaust sensor point 246 measures or otherwise determines the characteristics of combustion reactants exiting the engine 212 through the exhaust 222. The exhaust sensor point 246 may measure the temperature, $T_{ex}$, of the gases entering the high-pressure turbocharger 215. In many configurations, the pressure and mass flow, $P_{ex}$ and $\dot{m}_{ex}$, of the exhaust 222 will not be known, such that the exhaust sensor point 246 illustrates the location at which those characteristics will be determined or estimated by the control system 216.

A mid-stage sensor point 247 is located on the compressor side between the LP turbine 220 and the HP turbine 221. A turbine output sensor point 248 measures or otherwise determines the characteristics of combustion reactants exiting the low-pressure turbocharger 214.

In order to provide the desired boost pressure represented by the total boost command, the control system 216 varies the power captured by the LP turbine 220 and the HP turbine 221. Varying the flow of exhaust gases through the LP turbine 220 and the HP turbine 221 varies the power output thereof.

However, the gases exiting the exhaust 222 may vary greatly depending upon operating conditions of the engine 212, which in turn varies the power captured by LP turbine 220 and the HP turbine 221 and transferred to the LP compressor 230 and the HP compressor 231. Changes in the flow and energy provided by exhaust gases increases difficulty in accurately satisfying the total boost command.

One solution for providing the total boost command is for the powertrain 210 to use closed-loop feedback. In such a system, the actual boost pressure is monitored and compared to the total boost command. If there is a difference between the actual boost pressure and the total boost command, an adjustment is made to the power of the LP turbine 220. For example, if the actual boost pressure is too low, the power output of the LP turbine 220 is increased. However, a closed-loop system is likely to have considerable time lag, such that the actual boost pressure follows (in terms of time) the total boost command.

For the powertrain 210, the control system 216 implements a method or algorithm for controlling power captured by the LP turbine 220 and the HP turbine 221. The method is a feed-forward method, which instructs the low-pressure turbocharger 214 and the high-pressure turbocharger 215 to operate at settings—through actuation of the LP wastegate 226 and the HP wastegate 227—that will result in the actual boost pressure being substantially equal to the total boost command. The control system 216 may then also use a closed-loop modification system to make minor corrections to the output of the feed-forward method, if needed.

Figure 5B:
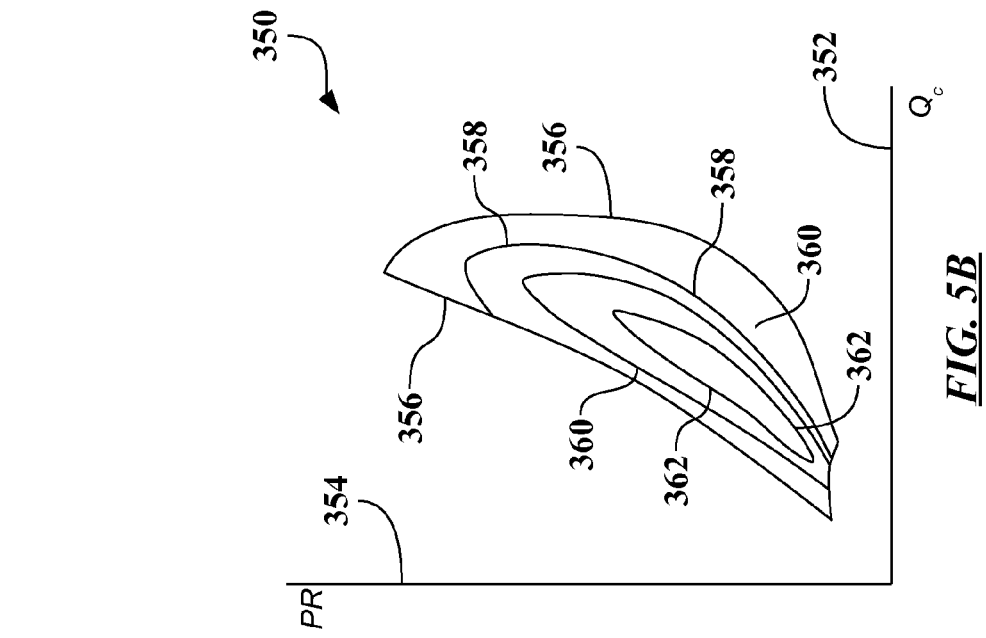
FIG. 5B is a schematic diagram of an exemplary turbo efficiency map for either a high-pressure or a low-pressure turbocharger.
Figure 5A:
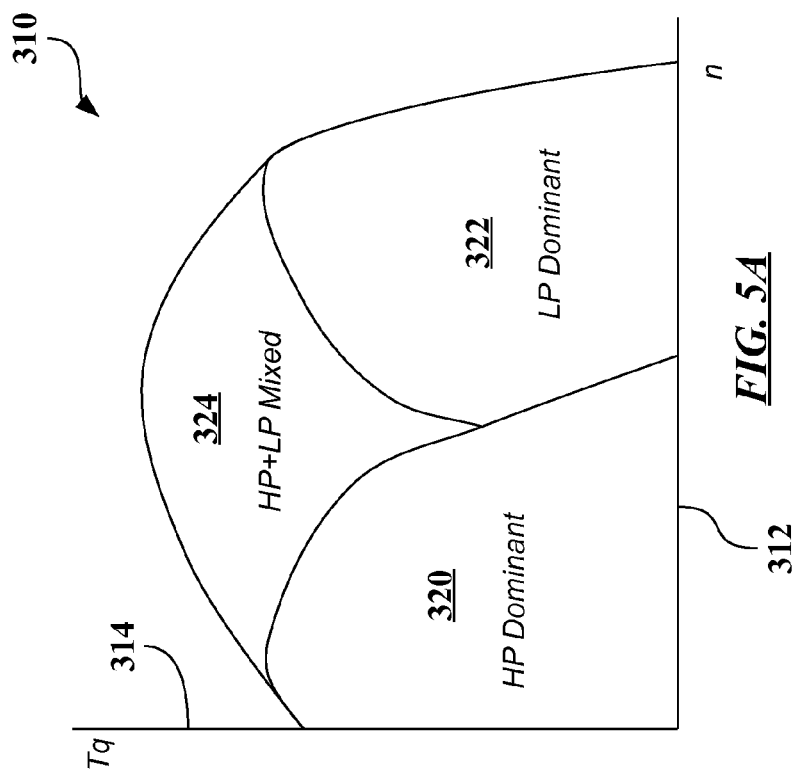
FIG. 5A is a schematic diagram of a turbo selection map based upon engine torque and speed.

Referring now to FIGS. 5A and 5B, and with continued reference to FIGS. 1-4, there are shown illustrative charts or maps that may be used to determine how the low-pressure turbocharger 214 and the high-pressure turbocharger 215 contribute to provide the total boost command. FIG. 5A shows a selection map 310 for determining a control or dominance mode for a two-stage turbocharger system.

An axis 312 is representative of engine speed, n; and an axis 314 is representative of engine torque, Tq. Note, however, that the scale and units of the selection map 310 is highly dependent upon the specific powertrain 210, low-pressure turbocharger 214 and high-pressure turbocharger 215. Furthermore, other characteristics may be used, such as the charge flow command, $\dot{m}_{ch}$, in place of engine torque, Tq.

Based on the torque and speed of the engine 212, the control system 216 may refer to a map similar to the selection map 310—in graphical, formulaic, or look-up table form—and determine whether one of the low-pressure turbocharger 214 and the high-pressure turbocharger 215 should control provision of boost to the engine 212 or whether both the low-pressure turbocharger 214 and the high-pressure turbocharger 215 should combine to deliver the requested boost pressure.

In a region 320, which is to the lower left and occurs under relatively low torque and low speed, the high-pressure turbocharger 215 is dominant, such that region 320 may be referred to as an HP dominant mode. In a region 322, which is to the lower right and occurs under relatively low torque but high speed, the low-pressure turbocharger 214 is dominant, such that region 322 may be referred to as an LP dominant mode. When only one of the low-pressure turbocharger 214 or the high-pressure turbocharger 215 is dominant, the other is providing a pressure ratio of substantially one, such that the subservient component is not providing any substantial boost to the intake 232.

Therefore, in HP dominant mode, shown by the region 320, the pressure ratio across the HP compressor 231, $PR_{HP}$, is substantially equal to the total pressure ratio, because the high-pressure turbocharger 215 is providing a substantial portion of the total boost command. The ratio across the HP compressor 231 is equal to the intake pressure, $P_i$, divided by the mid-stage pressure, $P_m$.

Similarly, in LP dominant mode, shown by the region 322, the pressure ratio across the LP compressor 230, $PR_{LP}$, is substantially equal to the total pressure ratio, because the low-pressure turbocharger 214 is providing a substantial portion of the total boost command. The ratio across the LP compressor 230 is equal to the mid-stage pressure, $P_m$, divided by the atmospheric pressure, $P_a$.

When operating in the HP dominant mode or the LP dominant mode, the powertrain 210 may provide benefits over the single-stage turbo system of powertrain 10. While in the HP dominant mode or the LP dominant mode, the powertrain 210 has chosen the more efficient of two possible turbocharger configurations, which cannot be done in single-stage systems.

When neither the low-pressure turbocharger 214 nor the high-pressure turbocharger 215 can reasonably, or efficiently, provide the required total boost, the powertrain 210 can use both the low-pressure turbocharger 214 and the high-pressure turbocharger 215. In a region 324, having generally high torque, the control system places the powertrain 210 into a mixed mode, where both the low-pressure turbocharger 214 and the high-pressure turbocharger 215 provide boost to the intake 232.

As stated before, $PR_{LP}=P_m/P_a$, and $PR_{HP}=P_i/P_m$. Solving each of these for the mid-stage pressure, $P_m$, results in an Equation 23, which leads to an Equation 24.

$$PR_{LP} \cdot P_a = \frac{P_i}{PR_{HP}} \tag{23}$$

$$PR_{LP} \cdot PR_{HP} = \frac{P_i}{P_a} = PR_{total} \tag{24}$$

Therefore, from Equation 24, the control system 216 may select individual pressure ratios for the LP compressor 230 and the HP compressor 231 that, when multiplied, result in the total pressure ratio, $PR_{total}$. For example, if the total pressure ratio required to supply the boost pressure command is 12, the control system may use $PR_{LP}$=3 and $PR_{HP}$=4, may use $PR_{LP}$=3.46 and $PR_{HP}$=3.46, or any other combination resulting in the total pressure ratio.

The control system 216 may use different algorithms for selecting each of the pressure ratios, such as making the individual ratios substantially equivalent to each other. However, the control system 216 may also select the most-efficient operating points for each of the LP compressor 230 and the HP compressor 231 that will still combine to provide the total pressure ratio.

Maximizing efficiency may occur through formulas or tables, which may be based on efficiency maps, such as those shown in FIG. 5B. The map 350 shown in FIG. 5B illustrates efficiency curves for a turbocharger. The map 350 could apply to the low-pressure turbocharger 214, or to the high-pressure turbocharger 215. An axis 352 represents the corrected flow, $Q_c$, passing through, for example, the LP compressor 230 and an axis 354 represents the pressure ratio, $PR_{LP}$.

Curves 356, 358, 360, and 362 represent different efficiency levels of the LP compressor 230. For illustrative purposes only, the curve 356 may have an efficiency of about 0.55, the curve 358 may have an efficiency of about 0.65, the curve 360 may have an efficiency of about 0.75, and the curve 362 may have an efficiency of about 0.8. The map 350 may include other information, such as the rotational speed of the LP compressor 230.

Therefore, based on the corrected flow, the control system 216 will select the most-efficient pressure ratios for each of the LP compressor 230 and the HP compressor 231 that will still combine to provide the total pressure ratio. Using the example above, where $PR_{total}$=12, the control system 216 may instead determine that the most-efficient combination is $PR_{LP}$=2 and $PR_{HP}$=6.

From the requested total boost command and the atmospheric conditions, the control system 216 can determine the desired pressure ratios for the LP compressor 230 and the HP compressor 231. If the control system 216 also knows the available power to the LP turbine 220 and the HP turbine 221, such as by measurements at the exhaust sensor point 246 and the mid-stage sensor point 247, the control system 216 is essentially left determining two, single-stage boost situations, as outlined in FIG. 3.

Operation of the LP wastegate 226 is calculated based on the desired compressor power required from the LP compressor 230 and the conditions on both sides of low-pressure turbocharger 214—between the atmosphere 234 and intake-side mid-stage sensor point 245 and between the exhaust-side mid-stage sensor point 247 and the turbine output 224. Operation of the HP wastegate 227 is calculated based on the desired compressor power required from the HP compressor 231 and the conditions on both sides of the high-pressure turbocharger 215—between the mid-stage sensor point 240 and the intake 232 and between the exhaust 222 and the mid-stage sensor point 247.

Figure 6A:
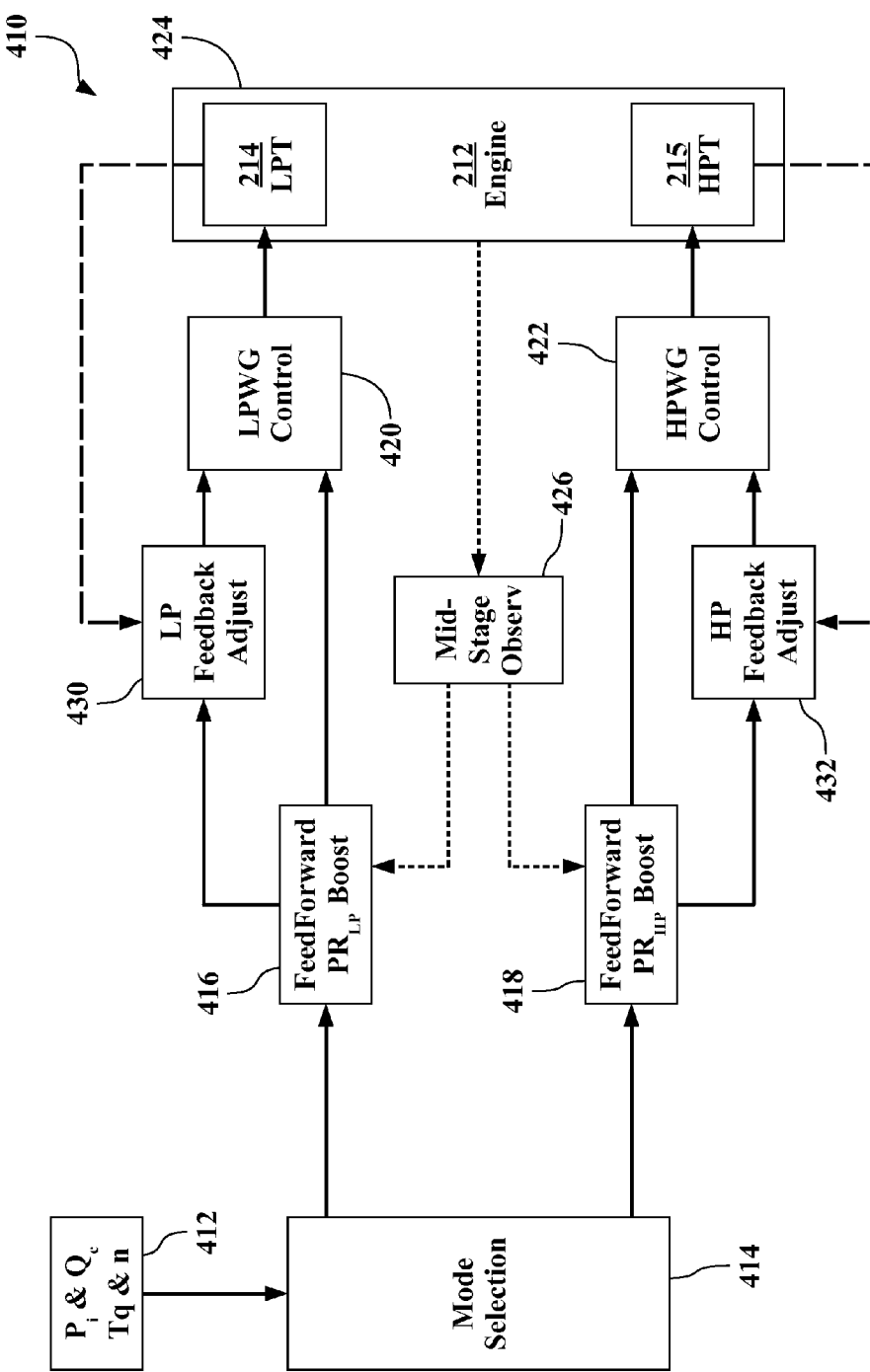
FIG. 6A is a schematic diagram of a controller architecture, which may be used with the powertrain shown in FIG. 4, and includes separate feedback loops for each turbocharger.
Figure 6B:
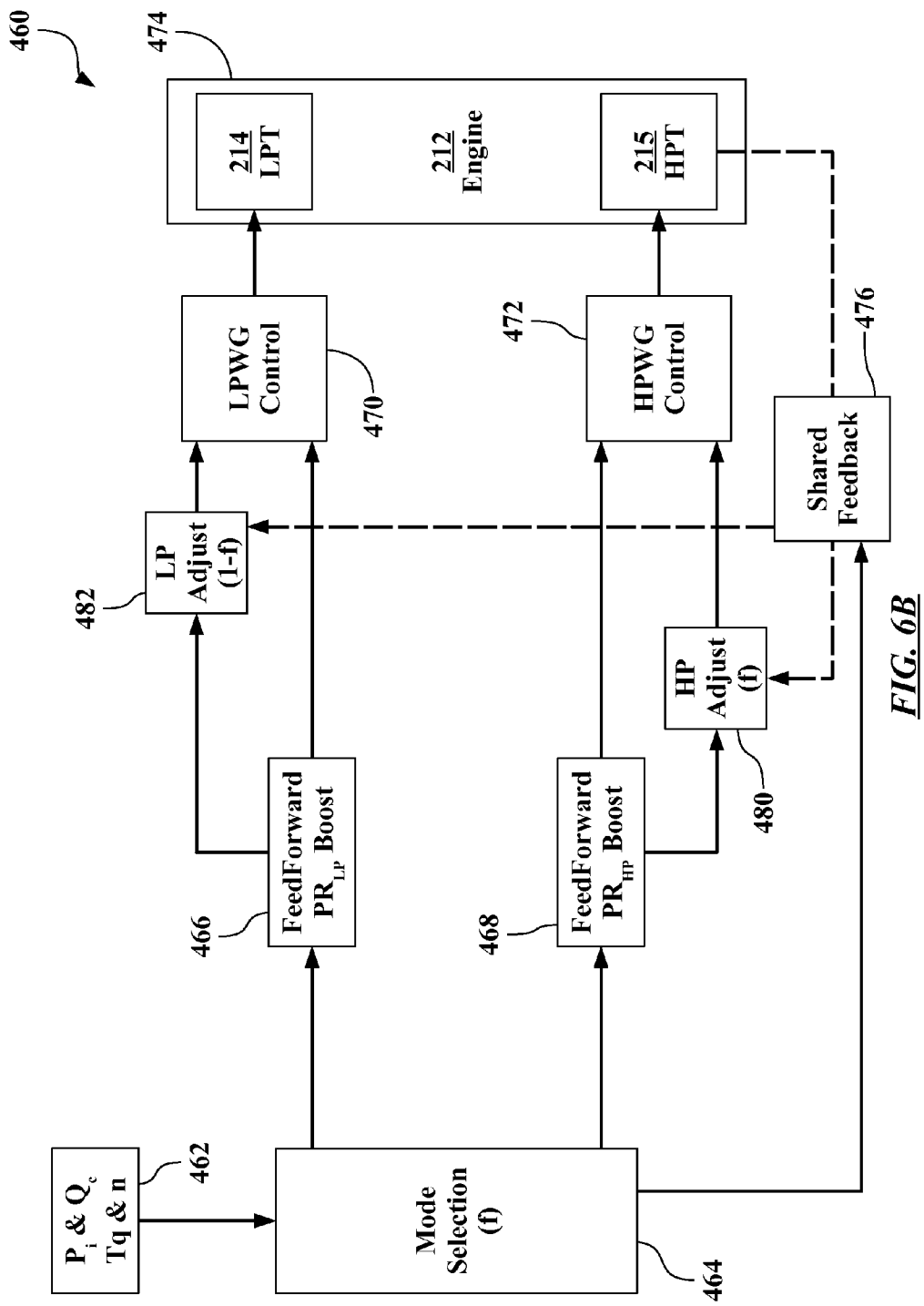
FIG. 6B is a schematic diagram of a controller architecture similar to that shown in FIG. 6A, but which uses a single, coordinated feedback loop for both turbochargers.

Referring now to FIGS. 6A and 6B, and with continued reference to FIGS. 1-5B, illustrative control architectures are shown for controlling the powertrain 210. Either of the architectures shown in FIGS. 6A and 6B may be implemented by the control system 216. FIG. 6A shows a control architecture 410, which may be embodied within the control system 216. The architecture 410 illustrates how the control system 216 may monitor several inputs and may calculate several commands for operating the powertrain 210, particularly the low-pressure turbocharger 214 and the high-pressure turbocharger 215. Note that the architecture 410 shown treats all EGR functions as occurring with the engine 212, and therefore only addresses boost control.

An input block 412 provides operational data and requests from the powertrain 210 to the control architecture 410. The input block 412 may be viewed as a set of givens for the control system 216. The inputs may include the boost pressure command, $P_i$, and the corrected flow, $Q_c$, needed to provide the requested boost. Additional inputs may include the torque, Tq, and speed, n, requested by the engine 212.

A mode selection block 414 determines the pressure ratios, $PR_{LP}$ and $PR_{HP}$, for the LP compressor 230 and the HP compressor 231, respectively. The mode selection block 414 may use formulas or tables, such as the selection map 310 shown in FIG. 5A, to determine whether one of the low-pressure turbocharger 214 and the high-pressure turbocharger 215 is dominant or whether both will contribute (mixed mode).

An LP feed forward block 416 receives at least the desired LP pressure ratio, and may also receive the desired mid-stage pressure. An HP feed forward block 418 receives at least the desired HP pressure ratio, and may also receive the desired mid-stage pressure and the boost pressure command. The LP feed forward signal may be based on the desired LP pressure ratio and corrected flow through the LP compressor 230, as shown in an Equation 25. The HP feed forward signal may be based on an Equation 26, which is a function of compressor power at the HP compressor 231, $E_{HPc}$, and the pressure, temperature, and corrected flow through the HP turbine 221.

$$LPFF_{ctrl} = f\left(\frac{P_m}{P_a}, Q_c\right) \tag{25}$$

$$HPFF_{ctrl} = f\left(\frac{E_{HPc}}{P_{em}\sqrt{T_{ex}}}, Q_{ex}\right) \tag{26}$$

From the respective pressure ratios an LP wastegate control block 420 and an HP wastegate control block 422, for the LP wastegate 226 and the HP wastegate 227, implement the feed forward control signals. These controllers convert the pressure and flow based signals and requests into physical movement of the LP wastegate 426 and the HP wastegate 427 on the low-pressure turbocharger 214 and the high-pressure turbocharger 215.

An engine control block 424 at least observes operation of the engine 212 and may also be involved in controlling the engine 212. The engine control block 424 may output observations of the engine 212, and particularly of the actual boost pressure, $P_{i\_measured}$, to a mid-stage observer block 426, which may largely benefit operations of the high-pressure turbocharger 215, such that the mid-stage observer block 426 may alternatively be referred to as the HP turbo observer. The mid-stage observer block 426 may be reading data from sensors or may be estimating mid-stage data, such as mid-stage exhaust pressure or mid-stage compressor pressure, $P_m$.

If the powertrain 210 utilizes closed-loop feedback adjustment in addition to feed forward (open-loop) controls, the control architecture 410 may also include feedback loops. An LP feedback block 430 receives either a measurement or an estimate of the mid-stage pressure, $P_m$, being generated by the LP compressor 230. If the actual mid-stage pressure is different from the desired mid-stage pressure, the LP feedback block 430 may increase or decrease flow through the LP wastegate 226 to decrease or increase, respectively, power transferred from the LP turbine 220 to the LP compressor 230.

Similarly, an HP feedback block 432 receives either a measurement or an estimate of the boost pressure, $P_i$, being generated by the HP compressor 231. The HP feedback block 432 then adjusts the HP wastegate 227 accordingly. Note that the control architecture 410 includes separate feedback loops for the low-pressure turbocharger 214 and the high-pressure turbocharger 215. The LP feedback block 430 and the HP feedback block 432 may be proportional-integral-derivative controllers (PID controllers), which are capable of determining differences between the target pressures and sending an adjustment for the respective wastegate based thereupon.

FIG. 6B shows another control architecture 460, which may be embodied within the control system 216. The control architecture 460 shown in FIG. 6B is similar to the control architecture 410 shown in FIG. 6A and several elements may be shared.

An input block 462 provides operational data and requests from the powertrain 210 to the control architecture 460, and may be viewed as a set of givens for the control system 216. A mode selection block 464 determines the pressure ratios, $PR_{LP}$ and $PR_{HP}$, for the LP compressor 230 and the HP compressor 231, respectively. The mode selection block 464 also calculates a power-split factor, f, as shown in Equation 27. The power-split factor is representative of the amount of boost contributed by the LP compressor 230 and the HP compressor 231.

$$f = \frac{PR_{HP}}{PR_{HP} + PR_{LP}} \qquad (27)$$

The power-split factor shows the amount of the total boost command that is provided by the HP compressor 231, particularly in mixed mode operation. If the mode selection block 464 instead selects the HP dominant mode, the power-split factor may be set to 1, or if the mode selection block 464 selects the LP dominant mode, the power-split factor may be set to 0. As shown herein, the power-split factor may also be used for feedback adjustment.

An LP feed forward block 466 receives at least the desired LP pressure ratio, and an HP feed forward block 468 receives at least the desired HP pressure ratio, and may also receive the desired mid-stage pressure and the boost pressure command. From the respective pressure ratios an LP wastegate control block 470 and an HP wastegate control block 472, for the LP wastegate 226 and the HP wastegate 227, implement the feed forward control signals. An engine control block 474 observes, at least, operation of the engine 212 and may also be involved in controlling the engine 212.

A shared feedback block 476 acts to monitor the actual boost pressure supplied to the engine 212 and make adjustments, if necessary. The control architecture 460 uses only a single-loop feedback control, unlike the double loop shown in the control architecture 410. This single loop is based only on the total boost provided by both the low-pressure turbocharger 214 and the high-pressure turbocharger 215. The shared feedback block 476 determines the amount of adjustment needed and then distributes that adjustment based on the power-split factor.

An HP adjustment block 480 takes the total adjustment signal from the shared feedback block 476 and multiplies that signal by the power-split factor, f. Correspondingly, an LP adjustment block 482 takes the total adjustment signal and multiplies that signal by one minus the power-split factor, 1−f. Therefore, the HP compressor 231 adjusts a relative amount based on its contribution to the total boost and the LP compressor 230 adjusts a relative amount based on its contribution to the total boost.

When the powertrain 210 is in HP dominant mode, such that the power-split factor is set to 1, all of the feedback adjustment from the shared feedback block 476 is sent through the HP adjustment block 480 and only the HP compressor 231 responds to closed-loop feedback. Similarly, when the powertrain 210 is in LP dominant mode, such that the power-split factor is set to 0, all of the feedback adjustment from the shared feedback block 476 is sent through the LP adjustment block 482 and only the LP compressor 230 responds to closed-loop feedback.

Figure 7:
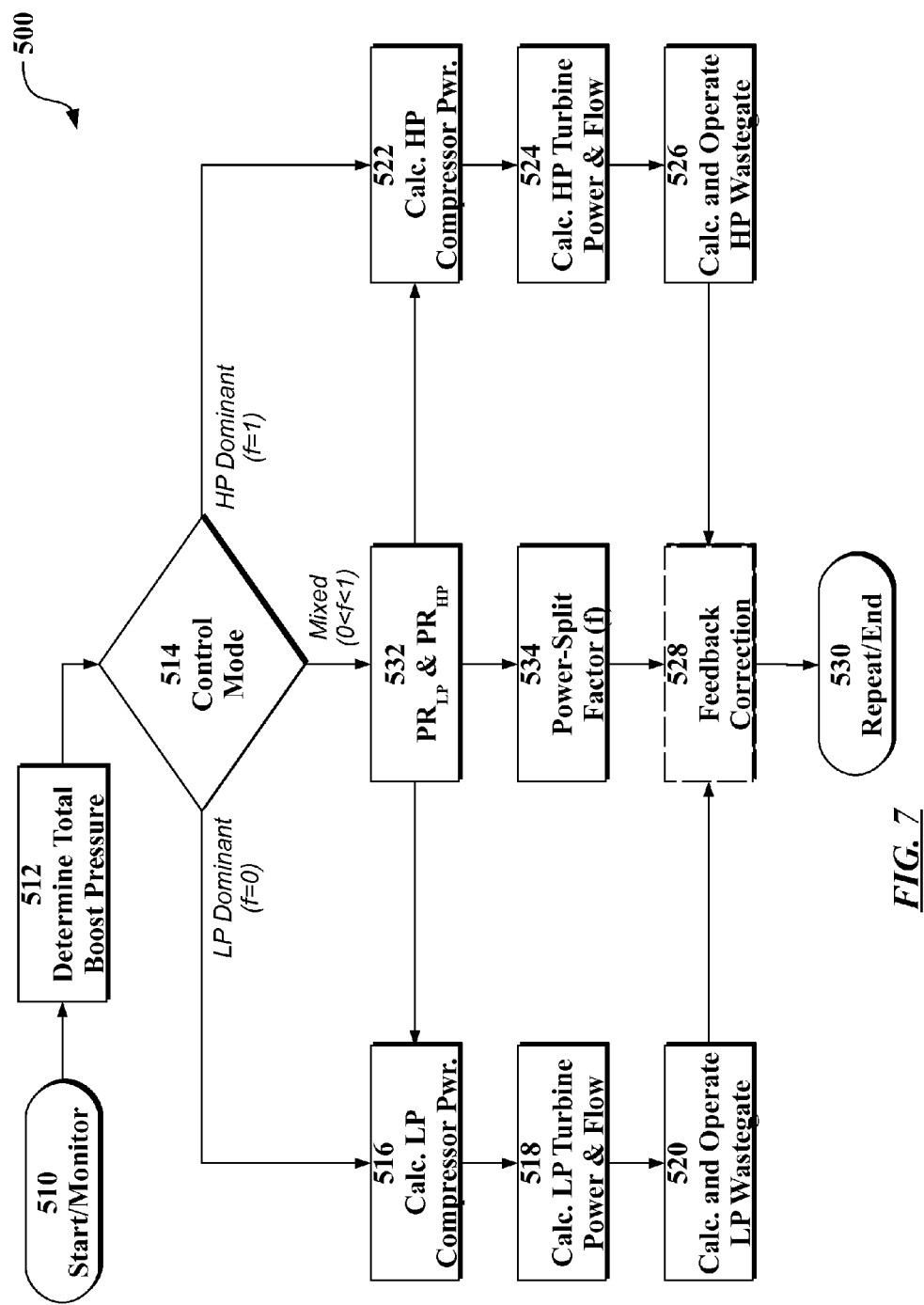
FIG. 7 is a schematic flow chart illustrating an algorithm or method for controlling powertrains with two-stage turbochargers, such as that shown with FIG. 4.

Referring now to FIG. 7, and with continued reference to FIGS. 1-6B, there is shown a method 500 for controlling a powertrain, such as the powertrain 210 shown in FIG. 4. The method 500 may be executed completely or partially within the control system 216.

FIG. 7 shows only a high-level diagram of the method 500. The exact order of the steps of the algorithm or method 500 shown may not be required. Steps may be reordered, steps may be omitted, and additional steps may be included. Furthermore, the method 500 may be a portion or sub-routine of another algorithm or method.

For illustrative purposes, the method 500 is described with reference to elements and components shown and described in relation to FIG. 4 and may be executed by the powertrain 210 itself or by the control system 216. However, other components may be used to practice the method 500 of the invention defined in the appended claims. Any of the steps may be executed by multiple controls or components of the control system 216.

Step 510: Start/Begin Monitoring.

The method 500 may begin at a start or initialization step, during which time the method 500 is made active and is monitoring operating conditions of the vehicle and the powertrain 210 and the engine 212. The method 500 also monitors and controls the low-pressure turbocharger 214 and the high-pressure turbocharger 215. Initiation may occur, for example, in response to the vehicle operator inserting the ignition key or in response to specific conditions being met. The method 500 may be running constantly or looping constantly whenever the vehicle is in use.

Any of the data output from the sensor points may be monitored by the method 500. Simple calculations within control system 216 or data provided by other modules or controllers are not described in detail and may be considered as monitored by the method 500. Furthermore, the control system 216 may be making estimates of operating conditions or states.

Step 512: Determine Desired Total Boost Pressure.

The method 500 includes determining the total boost command or desired total boost pressure for the two-stage turbocharger system. The total boost command, $P_i$, may be provided by another controller and provides sufficient combustion reactant for the engine 212 under the operating conditions of the powertrain 210. With the total boost command and the atmospheric pressure, the method 500 may also determine the total pressure ratio, $PR_{total}$. The general goal of the method 500 is to provide an actual intake pressure to the engine 212 that is equal to the total boost command.

Determining the total boost command may include determining a charge flow command for the intake 232 to the engine 212. Charge flow may be used as a proxy for torque from the engine 212, because the charge flow command is based on the torque requested. The method 500 also generally monitors or determines engine speed, n.

Step 514: Determine the Turbocharger Control Mode.

From operating conditions of the engine 212, the method 500 determines the operating mode for the low-pressure turbocharger 214 and the high-pressure turbocharger 215. The method 500 may use an algorithmic form of the selection map 310 shown in FIG. 5A. Depending on the conditions, the method 500 will select LP dominant mode, HP dominant mode, or mixed mode operation.

Step 516: Calculate LP Compressor Power.

The method 500 calculates LP compressor power from the determined total boost command. Compressor power is generally calculated from the pressure ratio across the LP compressor 230 and the corrected flow through the LP compressor 230.

In either the LP dominant mode or the HP dominant mode, the method 500 will treat the dominant pressure ratio as substantially equal to the total pressure ratio needed to provide the total boost command. Therefore, if the control system 216 uses the LP dominant control mode, then the total pressure ratio, $PR_{total}$, will be substantially equal to the LP pressure ratio, $PR_{LP}$. When in LP dominant mode, the HP pressure ratio is substantially equal to one and the power-split factor, f, may be set to zero.

Step 518: Calculate LP Turbine Power and Flow.

The method 500 includes calculating an LP turbine flow from the calculated LP compressor power. The turbine flow through the LP turbine 220 provides the energy used by the LP compressor 230 to generate the LP pressure ratio.

Step 520: Calculate Position and Operate LP Wastegate.

The method 500 calculates a position for the LP wastegate 226 from the calculated LP turbine flow. Commanding the low-pressure turbocharger 214 to operate at the calculated LP turbine flow includes setting the LP wastegate 226 to the calculated position.

Note that in LP dominant mode or HP dominant mode, the subservient turbocharger may have a default wastegate position to maintain the pressure ratio at approximately one. Therefore, even in LP dominant mode, the method 500 may have some minor control steps for the HP wastegate 227 or may automatically set the HP wastegate 227 to a default or neutral position. This may be considered part of the LP dominant steps or part of a separate step in which the HP pressure ratio is set equal to one.

Step 522: Calculate HP Compressor Power.

The method 500 calculates HP compressor power from the determined total boost command. Compressor power is generally calculated from the pressure ratio across the HP compressor 231 and the corrected flow through the HP compressor 231.

In the HP dominant mode, the method 500 will treat the dominant pressure ratio as substantially equal to the total pressure ratio needed to provide the total boost command and the subservient pressure ratio as substantially equal to one. Therefore, in HP dominant control mode the total pressure ratio, $PR_{total}$, will be substantially equal to the HP pressure ratio, $PR_{HP}$. When in HP dominant mode, the LP pressure ratio is substantially equal to one and the power-split factor, f, may be set to one.

Step 524: Calculate HP Turbine Power and Flow.

The method 500 includes calculating an HP turbine flow from the calculated HP compressor power. The turbine flow through the HP turbine 221 provides the energy used by the HP compressor 231 to generate the HP pressure ratio.

Step 526: Calculate Position and Operate HP Wastegate.

The method 500 calculates a position for the HP wastegate 227 from the calculated HP turbine flow. Commanding the high-pressure turbocharger 215 to operate at the calculated HP turbine flow includes setting the HP wastegate 227 to the calculated position. As with LP dominant mode, when in HP dominant mode the method 500 may have some minor control steps for the LP wastegate 226 or may automatically set the LP wastegate 226 to a default or neutral position.

Step 528: Single or Double-Loop Feedback Correction.

If the method 500 uses feedback correction, the control system 216 may have one or more feedback loops. If there are two feedback loops, one for each of the low-pressure turbocharger 214 and the high-pressure turbocharger 215, the control system 216 monitors, estimates, or determines the mid-stage pressure and the intake pressure. The method 500 then compares those pressures to the desired pressure and adjusts the LP wastegate 226 and the HP wastegate 227 as necessary. For example, if the mid-stage pressure is higher than desired, the control system 216 may further open the LP wastegate 226 to reduce flow through the LP turbine 220 and reduce the power transferred to the LP compressor 230.

In single-loop feedback systems, such as the control architecture 460, the control system 216 is only monitored or estimating the intake pressure and comparing that to the total boost command. Corrections or adjustments made based on feedback are then distributed to the respective LP wastegate 226 or HP wastegate 227 according to the power-split factor. This applies in single-loop systems regardless of whether the method 500 is operating in the HP dominant mode, the LP dominant mode, or mixed-mode.

Step 530: Repeat or End the Method.

After commanding operation of the turbocharger 14 and making or recording any corrections or adjustments for subsequent loops, the method 100 either ends or repeats. The method 100 may proceed to determine the desired boost pressure, $P_{i\_k+1}$, for the next iteration and operation of flow through the LP turbine 220 and the HP turbine 221.

Step 532: Select LP and HP Pressure Ratios.

When the control system 216 places the powertrain 210 into mixed-mode operation with both the low-pressure turbocharger 214 and the high-pressure turbocharger 215 contributing significant boost, the method 500 selects the individual pressure ratios for the LP compressor 230 and the HP compressor 231. Based on the total pressure ratio and the corrected flow, the control system 216 looks for the most-efficient combination of the LP pressure ratio and the HP pressure ratio that combine to yield the total pressure ratio. The control system 216 may use algorithmic forms of efficiency maps similar to that illustrated in FIG. 5B.

The LP pressure ratio is equal to the mid-stage pressure, between the LP compressor 230 and the HP compressor 231, divided by the atmospheric pressure and the HP pressure ratio is equal to the total boost command divided by the mid-stage pressure. The LP pressure ratio multiplied by the HP pressure ratio equals the total pressure ratio.

After the control system 216 has determined the individual pressure ratios for the LP compressor 230 and the HP compressor 231 the remaining determinations may be calculated as two, single-stage, operations for determining and effecting the positions of the LP wastegate 226 and the HP wastegate 227. The method 500 sends the individual pressure ratios to steps 516 and 522 for implementation and actuation of the LP wastegate 226 and the HP wastegate 227. Note that, at least for wastegate operation, the control system 216 may not need to directly calculate or use the mid-stage pressure, because the method 500 uses the pressure ratios to determine power needed from the compressors.

Step 534: Calculate Power-Split Factor.

In the LP dominant or the HP dominant mode, the power-split factor is either zero or one. However, in mixed-mode operations, the method 500 may calculate or determine the power-split factor from the LP pressure ratio and the HP pressure ratio. One exemplary calculation of the power-split factor is shown in Equation 27 above.

From the power-split factor, the method 500 may then implement single-loop feedback correction for mixed-mode operation. The method 500 monitors the actual boost pressure and determines a combined feedback signal based on the monitored actual boost pressure. The method 500 distributes the combined feedback signal to the LP wastegate 226 and the HP wastegate 227 based on the power-split factor. The control system 216 then controls the HP wastegate 227 based on the combined feedback signal multiplied by the power-split factor, and controls the LP wastegate 226 based on the combined feedback signal multiplied by one minus the power-split factor (1−f).

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A method for controlling a two-stage turbocharger system having a low-pressure turbocharger and a high-pressure turbocharger sequentially in line with an engine, wherein the low-pressure turbocharger has a low-pressure turbine (LP turbine) and a low-pressure compressor (LP compressor) and the high-pressure turbocharger has a high-pressure turbine (HP turbine) and a high-pressure compressor (HP compressor), wherein the LP compressor is operatively connected to the HP compressor, which is operatively connected to an intake of the engine, and the LP turbine is operatively connected to the HP turbine, which is operatively connected to an exhaust of the engine, the method comprising:
    determining a total boost pressure for the two-stage turbocharger system, wherein the total boost pressure provides sufficient combustion reactant for the engine and determining the total boost pressure includes:
        determining a charge flow command for the intake to the engine;
        determining an engine speed; and
        calculating the total boost pressure from the charge flow command and the engine speed;
    calculating an LP compressor power from the determined total boost pressure, and calculating an LP turbine flow from the calculated LP compressor power;
    commanding the low-pressure turbocharger to operate at the calculated LP turbine flow;
    calculating an HP compressor power from the determined total boost pressure, and calculating an HP turbine flow from the calculated HP compressor power;
    commanding the high-pressure turbocharger to operate at the calculated HP turbine flow;
    monitoring an atmospheric pressure;
    determining a total pressure ratio, wherein the total pressure ratio is equal to the total boost pressure divided by the atmospheric pressure;
    determining an LP pressure ratio and an HP pressure ratio, wherein the LP pressure ratio is equal to a mid-stage pressure, between the LP compressor and the HP compressor, divided by the atmospheric pressure and the HP pressure ratio is equal to the total boost pressure divided by the mid-stage pressure, and wherein the LP pressure ratio multiplied by the HP pressure ratio equals the total pressure ratio; and
    wherein the LP compressor power is calculated from the determined LP pressure ratio, and the HP compressor power is calculated from the determined HP pressure ratio.

2. The method of claim 1, the high-pressure turbocharger further having an HP wastegate and the low-pressure turbocharger further having an LP wastegate configured to selectively allow exhaust to bypass the HP turbine and the LP turbine, respectively, and the method further comprising:
    calculating an HP wastegate position from the calculated HP turbine flow, wherein commanding the high-pressure turbocharger to operate at the calculated HP turbine flow includes setting the HP wastegate to the calculated HP wastegate position; and
    calculating an LP wastegate position from the calculated LP turbine flow, wherein commanding the high-pressure turbocharger to operate at the calculated LP turbine flow includes setting the LP wastegate to the calculated LP wastegate position.

3. The method of claim 2, further comprising:
    determining a power-split factor from the LP pressure ratio and the HP pressure ratio;
    monitoring an actual boost pressure;
    determining a combined feedback signal based upon the monitored actual boost pressure;
    distributing the combined feedback signal to the LP wastegate and the HP wastegate based upon the power-split factor, wherein:
        controlling the HP wastegate is based upon the combined feedback signal multiplied by the power-split factor, and
        controlling the LP wastegate is based upon the combined feedback signal multiplied by one minus the power-split factor.

4. The method of claim 3, further comprising:
    if the LP pressure ratio is substantially equal to one, setting the power-split factor to one; and
    if the HP pressure ratio is substantially equal to one, setting the power-split factor to zero.

5. A method for controlling a two-stage turbocharger system having a low-pressure turbocharger and a high-pressure turbocharger sequentially in line with an engine, wherein the low-pressure turbocharger has a low-pressure turbine (LP turbine) and a low-pressure compressor (LP compressor) and the high-pressure turbocharger has a high-pressure turbine (HP turbine) and a high-pressure compressor (HP compressor), wherein the LP compressor is operatively connected to the HP compressor, which is operatively connected to an intake of the engine, and the LP turbine is operatively connected to the HP turbine, which is operatively connected to an exhaust of the engine, and also having an HP wastegate and the low-pressure turbocharger further having an LP wastegate configured to selectively allow exhaust to bypass the HP turbine and the LP turbine, respectively, the method comprising:
    determining a total boost pressure for the two-stage turbocharger system, wherein the total boost pressure provides sufficient combustion reactant for the engine;
    calculating an LP compressor power from the determined total boost pressure, and calculating an LP turbine flow from the calculated LP compressor power;
    calculating an LP wastegate position from the calculated LP turbine flow;
    setting the LP wastegate to the calculated LP wastegate position such that the low-pressure turbocharger operates at the calculated LP turbine flow;

calculating an HP compressor power from the determined total boost pressure, and calculating an HP turbine flow from the calculated HP compressor power;

calculating an HP wastegate position from the calculated HP turbine flow;

setting the HP wastegate to the calculated HP wastegate position such that the high-pressure turbocharger operates at the calculated HP turbine flow;

monitoring an atmospheric pressure;

determining a total pressure ratio, wherein the total pressure ratio is equal to the total boost pressure divided by the atmospheric pressure;

determining an LP pressure ratio and an HP pressure ratio, wherein the LP pressure ratio is equal to a mid-stage pressure, between the LP compressor and the HP compressor, divided by the atmospheric pressure and the HP pressure ratio is equal to the total boost pressure divided by the mid-stage pressure, and wherein the LP pressure ratio multiplied by the HP pressure ratio equals the total pressure ratio; and wherein the LP compressor power is calculated from the determined LP pressure ratio, and the HP compressor power is calculated from the determined HP pressure ratio.

6. The method of claim 5, further comprising:

determining a power-split factor from the LP pressure ratio and the HP pressure ratio;

monitoring an actual boost pressure;

determining a combined feedback signal based upon the monitored actual boost pressure;

distributing the combined feedback signal to the LP wastegate and the HP wastegate based upon the power-split factor, wherein:

controlling the HP wastegate is based upon the combined feedback signal multiplied by the power-split factor, and controlling the LP wastegate is based upon the combined feedback signal multiplied by one minus the power-split factor.

7. The method of claim 6, further comprising:

if the LP pressure ratio is substantially equal to one, setting the power-split factor to one; and if the HP pressure ratio is substantially equal to one, setting the power-split factor to zero.

\* \* \* \* \*